(12) United States Patent
Vasquez et al.

(10) Patent No.: US 8,736,438 B1
(45) Date of Patent: May 27, 2014

(54) COMPUTING DEVICE AS A VEHICLE KEY

(71) Applicant: Google Inc., Mountain View, CA (US)

(72) Inventors: Juan Vasquez, San Jose, CA (US);
Vinson Mok, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/745,528

(22) Filed: Jan. 18, 2013

Related U.S. Application Data

(60) Provisional application No. 61/683,620, filed on Aug. 15, 2012.

(51) Int. Cl.
*B60R 25/00* (2013.01)
*G06F 7/04* (2006.01)
*H04B 5/02* (2006.01)
*B60R 25/20* (2013.01)
*G07C 9/00* (2006.01)

(52) U.S. Cl.
CPC ........ *B60R 25/2018* (2013.01); *G07C 9/00309* (2013.01)
USPC ................ 340/539.11; 340/426.11; 340/5.72; 340/5.61; 340/426.16; 455/41.2; 455/41.1; 701/2; 701/36

(58) Field of Classification Search
None
See application file for complete search history.

(56) References Cited

U.S. PATENT DOCUMENTS

| | | | |
|---|---|---|---|
| 2011/0063076 A1 | 3/2011 | Kurtz et al. | |
| 2011/0086668 A1* | 4/2011 | Patel | 455/556.1 |
| 2011/0112969 A1* | 5/2011 | Zaid et al. | 705/50 |
| 2011/0148574 A1* | 6/2011 | Simon et al. | 340/5.61 |
| 2011/0177780 A1 | 7/2011 | Sato et al. | |
| 2011/0210830 A1* | 9/2011 | Talty et al. | 340/10.51 |
| 2011/0215921 A1* | 9/2011 | Ben Ayed et al. | 340/539.11 |
| 2012/0019379 A1* | 1/2012 | Ben Ayed | 340/539.1 |
| 2012/0130604 A1* | 5/2012 | Kirshon et al. | 701/51 |
| 2012/0223810 A1* | 9/2012 | Petrucci et al. | 340/5.64 |
| 2012/0271486 A1* | 10/2012 | McDonald et al. | 701/2 |
| 2012/0280805 A1* | 11/2012 | Magner et al. | 340/426.11 |
| 2013/0082820 A1* | 4/2013 | Tieman | 340/5.61 |

OTHER PUBLICATIONS

NXP, "NXP Unlocks the Potential of Multifunction Car Keys," NXP Semiconductors, retrieved from http://www.nxp.com/news/press-releases/2011/06/nxp-unlocks-the-potential-of-multifunction-car-keys.html, Jun. 22, 2011, 2 pp.

Ricker, "BMW's NFC Key is your ticket to ride, and you should care (video)," Transportation, Wireless, retrieved at http://www.engadget.com/2011/02/02/bmws-nfc-key-is-your-ticket-to-ride-and-you-should-care-video/, Feb. 2, 2011, 6 pp.

(Continued)

*Primary Examiner* — Helal A Algahaim
*Assistant Examiner* — Paul Castro
(74) *Attorney, Agent, or Firm* — Shumaker & Sieffert, P.A.

(57) ABSTRACT

In general, this disclosure discloses techniques for using a computing device as a smart vehicle key. The computing device may send a validation request signal to a vehicle via a first short-range communication protocol. After to sending the validation request signal, the computing device may establish a secure connection with the vehicle over a second short-range communication protocol. The computing device may send via the secure connection an ignition signal to the vehicle that activates an ignition system operable to activate a motor of the vehicle. The computing device may periodically send via the secure connection a keep-alive message to the vehicle as the motor of the vehicle is running.

19 Claims, 3 Drawing Sheets

(56) References Cited

OTHER PUBLICATIONS

O'Connor, "RFID Is Key to Car Clubs' Success," RFID Journal, retrieved at http://www.rfidjournal.com/article/view/3839/1, Jan. 7, 2008, 4 pp.

Haller et al., "The S/KEY One-Time Password System," Network Working Group, RFC: 1760, Feb. 1995, 12 pp.

Haller et al., "A One-Time Password System," Network Working Group, RFC: 2289, Feb. 1998, 26 pp.

M'Raihi et al., "HOTP: An HMAC-Based One-Time Password Algorithm," Network Working Group, RFC: 4226, Dec. 2005, 35 pp.

Weng et al., "Computing Device as a Vehicle Key," U.S. Appl. No. 13/442,618, filed Apr. 9, 2012.

* cited by examiner

COMPUTING DEVICE AS A VEHICLE KEY

RELATED APPLICATION

This application claims the benefit of U.S. Provisional Application No. 61/683,620, filed Aug. 15, 2012, the entire content of which is incorporated herein in its entirety.

TECHNICAL FIELD

The invention relates to a computing device functioning as a vehicle key to control one or more functionalities of the vehicle.

BACKGROUND

A vehicle equipped with a smart vehicle key system may be able to unlock its doors or to activate its ignition system upon detecting a smart vehicle key associated with the vehicle. Typically, the smart vehicle key may include a transmitter that transmits signals to the vehicle to enable the vehicle to unlock its doors or to activate its ignition system.

SUMMARY

In one aspect, the disclosure is directed to a method. The method may include sending, from a computing device to a vehicle via a first short-range communication protocol, a validation request signal. The method may further include, after sending the validation request signal, establishing, by the computing device, a secure connection with the vehicle over a second short-range communication protocol. The method may further include sending, by the computing device via the secure connection, an ignition signal to the vehicle that activates an ignition system operable to activate a motor of the vehicle. The method may further include periodically sending, by the computing device via the secure connection, a keep-alive message to the vehicle as the motor of the vehicle is running.

In another aspect, the disclosure is directed to a computing device. The computing device may include one or more processors. The computing device may further include a near field communication (NFC) module configured to send a validation request signal to a vehicle via a first short-range communication protocol. The computing device may further include a Bluetooth module configured to, after to sending the validation request signal by the NFC module, establish a secure connection with the vehicle over a second short-range communication protocol. The computing device may further include an ignition module operable on the one or more processors and configured to send via the secure connection an ignition signal to the vehicle that activates an ignition system operable to activate a motor of the vehicle. The computing device may further include a keep-alive module operable on the one or more processors and configured to periodically send a keep-alive message via the secure connection to the vehicle as the motor of the vehicle is running.

In another aspect, the disclosure is directed to a computer-readable medium comprising instructions. The instructions, when executed on at least one programmable processor, may cause the at least one programmable processor to perform operations. The operations may include sending, from a computing device to a vehicle via a first short-range communication protocol, a validation request signal. The operations may further include, after sending the validation request signal, establishing, by the computing device, a secure connection with the vehicle over a second short-range communication protocol. The operations may further include sending, by the computing device via the secure connection, an ignition signal to the vehicle that activates an ignition system operable to activate a motor of the vehicle. The operations may further include periodically sending, by the computing device via the secure connection, a keep-alive message to the vehicle as the motor of the vehicle is running.

The details of one or more aspects of the disclosure are set forth in the accompanying drawings and the description below. Other features, objects, and advantages of the disclosure will be apparent from the description and drawings, and from the claims.

DETAILED DESCRIPTION

Generally, aspects of this disclosure are directed toward techniques for a computing device to communicate with a vehicle in order to control functionalities of the vehicle. The functionalities of the vehicle that may be controlled using the computing device may include, but are not limited to, locking and/or unlocking one or more doors of the vehicle, opening and closing assisted doors and windows of the vehicle, activating an ignition system of the vehicle, and controlling the motor (e.g., engine) of the vehicle.

A user may use a computing device, such as a mobile phone, to unlock a door of a vehicle by simply bumping or tapping the computing device with a short-range wireless device, such as a near-field communication (NFC) device or a radio-frequency identification (RFID) device, located on the door, or by moving the computing device within proximity (e.g., about 4 centimeters) of the short-range wireless device located on the door. Besides unlocking the door, the bumping or tapping of the computing device with the short-range wireless device or the moving of the computing device within proximity of the short-range wireless device may also enable a secure connection to be automatically formed via wireless communication, such as Bluetooth, Wi-Fi Direct, or any other personal area network, between the computing device and the vehicle without further user intervention.

Once the secure connection is formed via wireless communication, the computing device may also activate the ignition system of the vehicle as long as the computing device is connected via the wireless communication with the vehicle. Activating the ignition system may allow a user to simply press a button or flick a switch in the vehicle to start the motor (e.g., engine) of the vehicle. The computing device may periodically send keep-alive messages to the vehicle through the secure connection to signal to the vehicle that the computing device is still in or near the vehicle. If the vehicle misses a certain number of keep-alive messages, the vehicle's motor may be shut down because the vehicle can no longer detect the computing device.

Aspects of the present disclosure may include one or more potential advantages. For example, the technique of using both short-range wireless communication and wireless communication to communicate with a vehicle may enable the wireless connection between the computing device and the vehicle to be more easily formed in a single step of the computing device communicating with the vehicle using short-range wireless communication, while taking advantage of wireless communication's relatively longer communication range compared to short-range communication to activate the ignition system of the vehicle and to periodically send keep-alive messages to the vehicle.

Figure 1:
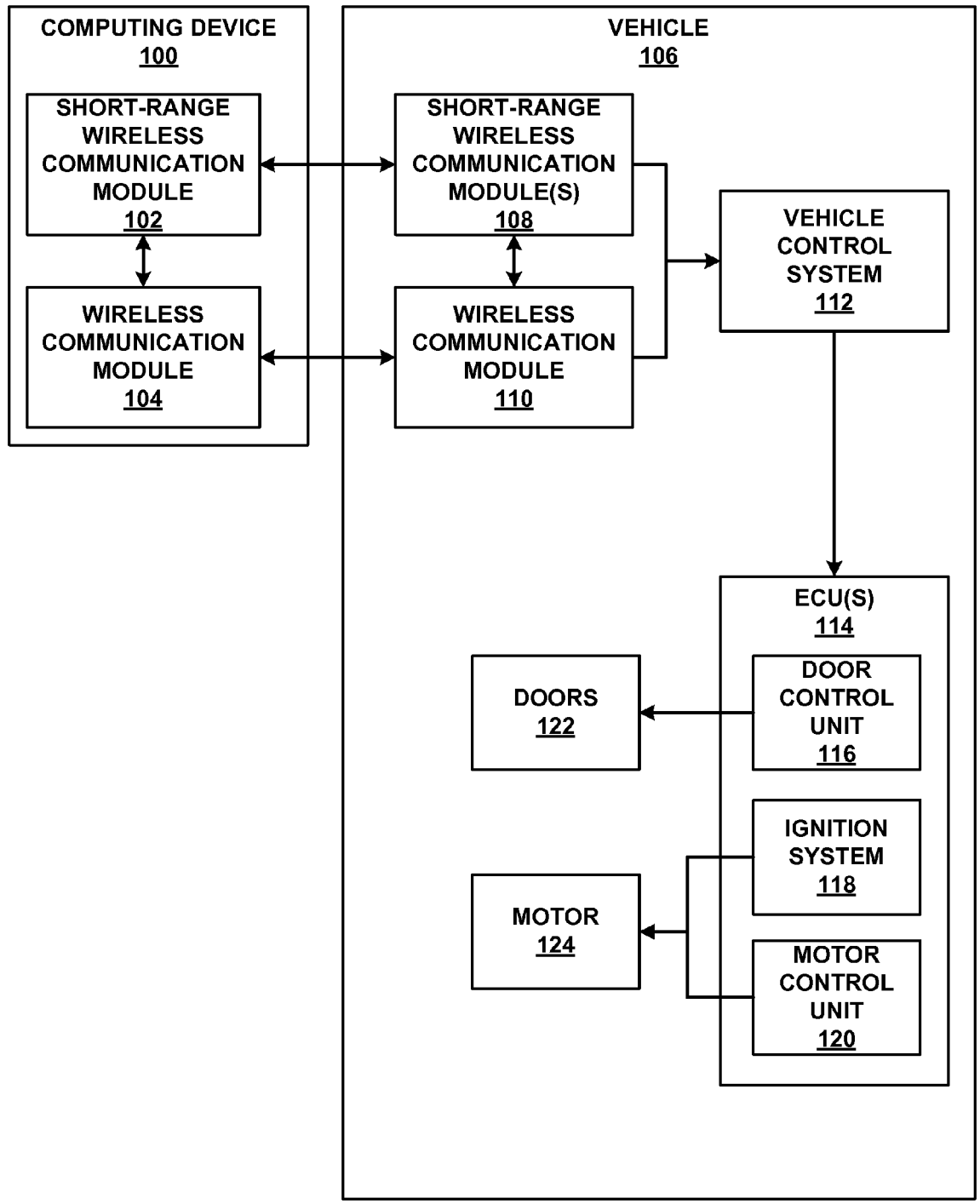
FIG. 1 illustrates a block diagram illustrating an example computing device communicating with an example vehicle according to some aspects of the present disclosure.

FIG. 1 illustrates a block diagram illustrating an example computing device 100 communicating with an example vehicle 106. As shown in FIG. 1, computing device 100 may include short-range wireless communication module 102, such as a near field communication (NFC) module or a radio-frequency identification (RFID) module, and wireless communication module 104, such as a Bluetooth module, a WiFi Direct module, or a personal area network modules. A vehicle 106 may include one or more short-range wireless modules 108, wireless communication module 110, vehicle control system 112, one or more electronic control units (ECUs) 114, doors 122, and motor 124. short-range wireless communication module 102 in computing device 100 may communicate with one or more short-range wireless communication modules 108 in vehicle 106, the wireless communication module 104 in computing device 100 may communicate with wireless communication module 110 in vehicle 106.

Computing device 100 may act as a smart vehicle key to vehicle 106. Short-range wireless communication module 102 in computing device 100 may communicate with one or more short-range wireless communication modules 108 in vehicle 106 via short-range wireless communication, such as NFC or RFID, and wireless communication module 104 in computing device 100 may communicate with wireless communication module 110 in vehicle 106 via wireless communication, such as Bluetooth or WiFi Direct. Such communications between computing device 100 and vehicle 106 may enable computing device 100 to control one or more functionalities of vehicle 106.

In some examples, computing device 100 may enroll or otherwise associate with vehicle 106 before computing device 100 is authorized to act as a vehicle key to vehicle 106. Computing device 100 may be placed near (e.g., within four centimeters or less) one of one or more short-range wireless communication modules 108 of vehicle 106, so that short-range wireless communication module 102 included in computing device 100 may communicate with one of one or more short-range wireless communication modules 108. Computing device 100, in some examples, may be required to communicate with one of one or more short-range wireless communication modules 108 that is located within the passenger compartment of vehicle 106 to enroll computing device 100 with vehicle 106.

After computing device 100 has been moved so that NFC module 102 included in computing device 106 is within range of one of one or more NFC modules 108 included in vehicle 106, computing device 100 may send a unique identifier associated with computing device 100 to vehicle 106 via NFC. The unique identifier, in some examples, may be an Electronic Serial Number, International, Mobile Equipment Identity number, Mobile Equipment Identifier, Media Access Control address, or any other unique identifier associated with computing device 100 that uniquely identifies computing device 100. The unique identifier may also be an Electronic Serial Number or any other unique identifier associated with short-range wireless communication module 102. Such a unique identifier may be stored in the secure element of the short-range wireless communication module 102. Along with the unique identifier, computing device 100 may also send an enrollment request to vehicle 106 via short-range wireless communication, such as NFC or RFID.

One or more short-range wireless communication modules 108 may forward the unique identifier and enrollment request received from computing device 100 to vehicle control system 112, and vehicle control system 112 may generate a unique key for computing device 100. Generating a unique key for computing device 100 may include hashing the unique identifier with a nonce (an arbitrary number used only once for cryptographic purposes) to create the unique key. After the unique key has been generated by vehicle control system 112, the unique key may be passed from vehicle control system 112 to one of one or more short-range wireless communication modules 108, and from the one of one or more short-range wireless communication modules 108 to short-range wireless communication module 102.

The unique key may be used by computing device 100 to identify itself as an enrolled device for vehicle 106 that is authorized to act as a vehicle key for vehicle 106. The unique key may also be used by computing device 100 for other purposes, such as a seed for One-Time Password (OTD)-based interactions. The unique key may be used by computing device 100 to identify itself to vehicle 106 instead of the unique identifier associated with computing device 100 because the unique identifier associated with computing device 100 may be more easily discovered compared to the unique key and thus may be less secure compared to the unique key. For example, if the unique identifier of computing device 100 is an ESN or MEID, then the ESN or MEID may be easily discovered because a mobile phone's ESN or MEID may typically be printed in the mobile phone's battery compartment or may be easily accessible in the settings. Meanwhile, because the unique key may be created from a hash of the unique identifier with a nonce, it is much more difficult for an unauthorized user or unauthorized device to discover the unique key for computing device 100.

After computing device 100 has been enrolled with vehicle 106, computing device 100 may be used as a vehicle key for vehicle 106. Computing device 100 may be moved within range of one of one or more short-range wireless communication modules 108 included in vehicle 106, and computing device 100 may send a validation request signal to vehicle 106 via short-range wireless communication. In response to receiving the validation request signal, vehicle 106 may determine whether computing device 100 is authorized to act as a vehicle key for vehicle 106 and, upon successful determination, may validate computing device 100 as a vehicle key for vehicle 106. Vehicle 106 may also unlock one or more of doors 122 without further user intervention in response to receiving the validation request signal. The validation request signal may be sent by short-range wireless communication module 102 in computing device 100 via short-range wireless communication to one of one or more short-range wireless communication modules 108 in vehicle 106. For example, the one of one or more short-range wireless communication modules 108 may be located on one of the doors 122 of vehicle 106. Computing device 100 may be moved within proximity of that one of one or more short-range wireless communication modules 108 located on one of the doors 122, and short-range wireless communication module 102 in computing device 100 may communicate with the one of one or more short-range wireless communication modules 108 to unlock the door on which the one of one or more short-range wireless communication modules 108 is located. The validation request signal may cause or otherwise enable the one of one or more short-range wireless communication modules 108 to communicate with vehicle control system 112, and may further cause or otherwise enable vehicle control system 112 to communicate with door control unit 116 in one or more ECUs 114 to unlock one or more of doors 122 of vehicle 106.

In some examples, computing device 100 may communicate with one of one or more short-range wireless communication modules 108 that is located within the passenger compartment of vehicle 106, such as being on or near the console of vehicle 106, instead of being located on or near doors 122 of vehicle 106. Vehicle 106 may, for example, include a dock embedded with the one of one or more short-range wireless communication modules 108 that is situated on the console that may be operable to dock and communicate with computing device 100. A use may bump, tap, or wave computing device 100 near the one of one or more short-range wireless communication modules 108 to send a validation request signal to the one of one or more short-range wireless communication modules 108.

The validation request signal sent by computing device 100 to vehicle 106 may include the unique key generated by vehicle control system 112 for computing device 100 during the enrollment process, and computing device 100 may be validated by vehicle 106 based at least in part on the unique key. Vehicle control system 112 included in vehicle 106 may validate the unique key passed by computing device 100 by comparing the unique key sent by computing device 100 with records of authorized unique keys stored in vehicle control system 112, and vehicle control system 112 may communicate with door control unit 116 to unlock one or more of doors 122 if the unique key is successfully validated by vehicle control system 112 as an authorized unique key.

After successful validation of the unique key associated with computing device 100, vehicle control system 112 may generate a symmetric encryption key that may be passed via short-range wireless communication to computing device 100 as part of a signal or indication sent to computing device 100 indicating that computing device 100 is authorized to act as a vehicle key for vehicle 106. Vehicle 106 may also send a wireless communication pairing request, such as a Bluetooth pairing request or a WiFi direct pairing request, to computing device 100 as part of the signal to pair wireless communication module 110 included in vehicle 106 with wireless communication module 104 included in computing system 100. In response to receiving the wireless communication pairing request and the symmetric encryption key from vehicle 106, wireless communication module 104 may pair with wireless communication module 110 so that computing device 100 may establish a secure connection with vehicle 106, including establishing a secure connection between wireless communication module 104 and wireless communication module 110 without further user intervention.

Establishing the secure connection between computing device 100 and vehicle 106 may include encrypting communications between wireless communication module 104 included in computing device 100 and wireless communication module 110 included in vehicle 106 using the symmetric encryption key passed by vehicle 106 to computing device 100. Sending data via the secure connection may include encrypting the data using the symmetric encryption key before transferring the data between wireless communication module 104 and wireless communication module 110. Because vehicle 106 may also have a copy of the symmetric encryption key, vehicle 106 may be able to decode messages sent from computing device 100 that are encrypted by the symmetric encryption key. The secure connection between computing device 100 and vehicle 106 may also be established and secured using any other well-known security or cryptography techniques.

After establishing the secure connection between wireless communication module 104 and wireless communication module 110, computing device 100 may send, via the secure connection between wireless communication module 104 and wireless communication module 110, an ignition signal to vehicle 106. Sending the ignition signal to vehicle 106 via the secure connection may include encrypting the ignition signal with the symmetric encryption key before sending the ignition signal to vehicle 106. The ignition signal may be communicated by wireless communication module 110 to vehicle control system 112, and, in response, vehicle control system 112 may active ignition system 118 in one or more ECUs 114.

After being activated, ignition system 118 may be operable to start motor 124 of vehicle 106. For example, ignition system 118 may include a physical button or other physical control that may be pressed or otherwise selected to start motor 124 in vehicle 106.

Motor 124 may be any machine designed to convert energy into useful mechanical motion. Motor 124, in some examples, may include but is not limited to an internal combustion engine, an external combustion engine, an electrical motor, a hydraulic engine, pneumatic motors, and the like. In some examples, motor 124 may include an electric motor of a hybrid electric vehicle.

After motor 124 in vehicle 106 is started, computing device 100 may periodically send, via the secure connection between wireless communication module 104 and wireless communication module 110, a keep-alive message to vehicle 106 as motor 124 in vehicle 106 is running. The keep-alive message may be communicated by wireless communication module 110 to vehicle control system 112. Vehicle control system 112 may communicate with motor control unit 120 in one or more ECUs 114 based on the keep-alive message sent by computing device 100. If computing device 100 stops periodically sending the keep-alive message, so that vehicle 106 misses a specified quantity of keep-alive message from computing device 100 for a specified amount of time, vehicle control system 112 may communicate with motor control unit 120 to initiate shutoff of motor 124. Thus, it may be necessary for computing device 100 to continually and periodically send the keep-alive message to vehicle 106 while motor 124 is running to ensure that motor 124 is not shut off. In some examples, computing device 100 may continuously and periodically send the keep-alive message to vehicle 106 before motor 124 is started, and motor 124 may in some instances not start unless vehicle 106 receives the keep-alive messages from computing device 100. For example, ignition system 118 may not be activated unless vehicle 106 periodically receives the keep-alive messages from computing device 100.

The requirement by vehicle 106 to periodically receive keep-alive messages from computing device 100 to prevent the motor 124 from being turned off may be overridden by a user. Overriding the keep-alive message requirement may be useful if, for example, computing device 100 is a battery-powered mobile computing device, so that the motor 124 may continue to operate even if computing device 100 shuts off due to a drained battery. An override code may be entered into vehicle 106 via any suitable means to override the keep-alive message requirement. For example, vehicle 106 may have a user interface (not shown) for a navigation system, speakerphone, stereo system, or other in-vehicle functionality, and the override code may be entered via the user interface. Alternatively, computing device 100 may send the override code to vehicle 106 via the secure connection established between wireless communication module 104 and wireless communication module 110. For example, computing device 100 may receive a passcode as input from the user, such as a pass code or a personal identification number, at a user interface (not shown) that may cause computing device 100 to send the override code to vehicle 106. In some examples, short-range wireless communication modules 108 can energize (i.e. provide power) to short-range wireless communication module 102 in computing device 100 so that short-range wireless communication module 102 can send an override command to vehicle 106 even if the battery of computing device 100 is already fully drained.

Computing device 100 may be a mobile computing device, including but not limited to a mobile phone, a tablet computer, a personal digital assistant, a handheld computer, a media player, and the like, including a combination of two or more of these items. Vehicle 106 may be a motor vehicle, such as an automobile (e.g., a car or a truck), a motorcycle or moped, an all-terrain vehicle, a tractor, and the like. Wireless communication module 104 and wireless communication module 110 may include any devices, transmitters, and/or receivers that are capable of exchanging data via wireless communication protocols, such as a Bluetooth protocol or a WiFi direct protocol.

Short-range wireless communication module 102 and one or more short-range wireless communication modules 108 may include two different modes of operation to communicate with each other. For example, short-range wireless communication module 102 and one or more short-range wireless communication modules 108 may include an active mode and a passive mode of operation to communicate via short-range wireless communication, such as NFC or RFID. In an active mode of operation, short-range wireless communication module 102 may generate a first radio field that is received by one or more short-range wireless communication modules 108 in physical proximity to short-range wireless communication module 102. In response, one or more short-range wireless communication modules 108 may generate a second radio field that is received by short-range wireless communication module 102. In this way, data may be communicated between short-range wireless communication module 102 and one or more short-range wireless communication modules 108, such as by using peer-to-peer communication.

In a passive mode of operation, load modulation techniques may be employed to facilitate data communication between short-range wireless communication module 102 and one or more short-range wireless communication modules 108. In a passive mode, one or more short-range wireless communication modules 108 may not generate a radio field in response to the radio field of short-range wireless communication module 102. Instead, one or more short-range wireless communication modules 108 may be electrical hardware (e.g., an NFC module) that generates a change in impedance in response to the radio field generated by short-range wireless communication module 102. For example, short-range wireless communication module 102 may generate a radio field that is received by one or more short-range wireless communication modules 108. Electrical hardware in one or more short-range wireless communication modules 108 may generate a change in impedance in response to the radio field. The change in impedance may be detected by short-range wireless communication module 102. In this way, load modulation techniques may be used by short-range wireless communication module 102 to communicate with one or more short-range wireless communication modules 108. In other words, short-range wireless communication module 102 may receive data from one or more NFC modules 108, but one or more NFC modules 108 may not receive any data from short-range wireless communication module 102 in the passive mode. Other well-known modulation techniques including phase modulation and/or amplitude modulation may also be employed to facilitate data communication between short-range wireless communication module 102 and one or more short-range wireless communication modules 108 in other examples.

Generally, one or more short-range wireless communication modules 108 may be short-range wireless communication modules that operate in an active short-range wireless communication mode. In other words, one or more short-range wireless communication modules 108 may include active short-range wireless communication hardware. This active short-range wireless communication hardware may be configured to emulate passive short-range wireless communication hardware or participate in active near field communication. Although a user may physically touch, bump, or tap computing device 100 to one or more short-range wireless communication modules 108, short-range wireless communication module 102 of computing device 100 may be capable of communicating with one or more short-range wireless communication modules 108 without physically contacting one or more short-range wireless communication modules 108.

In some examples, vehicle control system 112 may be any combination of software, hardware, switches, valves, actuators, and/or other devices that communicates with and controls the functionalities of one or more ECUs 114. Vehicle control system 112 may include or may be coupled to one or more of ECUs 114. ECUs 114 may control one or more of the electrical systems and subsystems of vehicle 106 and may control one or more functionalities of vehicle 106. One or more ECUs 114 may include but are not limited to an airbag control unit, a body control module, a convenience control module, an ignition control unit, an electric power steering control unit, a man-machine interface, a powertrain control module, a seat control unit, a speed control unit, a telephone control unit, a transmission control unit, a brake control module, an audio system, door control unit 116, ignition system 118, motor control unit 120, and the like, or any suitable combination thereof.

Door control unit 116 may control the locking and unlocking of doors 122 of vehicle 106. Door control unit 116 may also control the locking and unlocking and/or the opening and closing of doors controlled by door assist modules (not shown), windows, trunk doors, sunroofs, and the like. Ignition system 118 may enable motor 124 of vehicle 106 to be started without physically contacting or inserting a vehicle key to the ignition of vehicle 106. Motor control unit 120 may control motor 124 of vehicle 106, including controlling the fuel mixture, ignition timing, and/or other parameters of motor 124. In some examples, motor control unit 120 may shut down motor 124 if commanded by vehicle control system 112.

Figure 2:
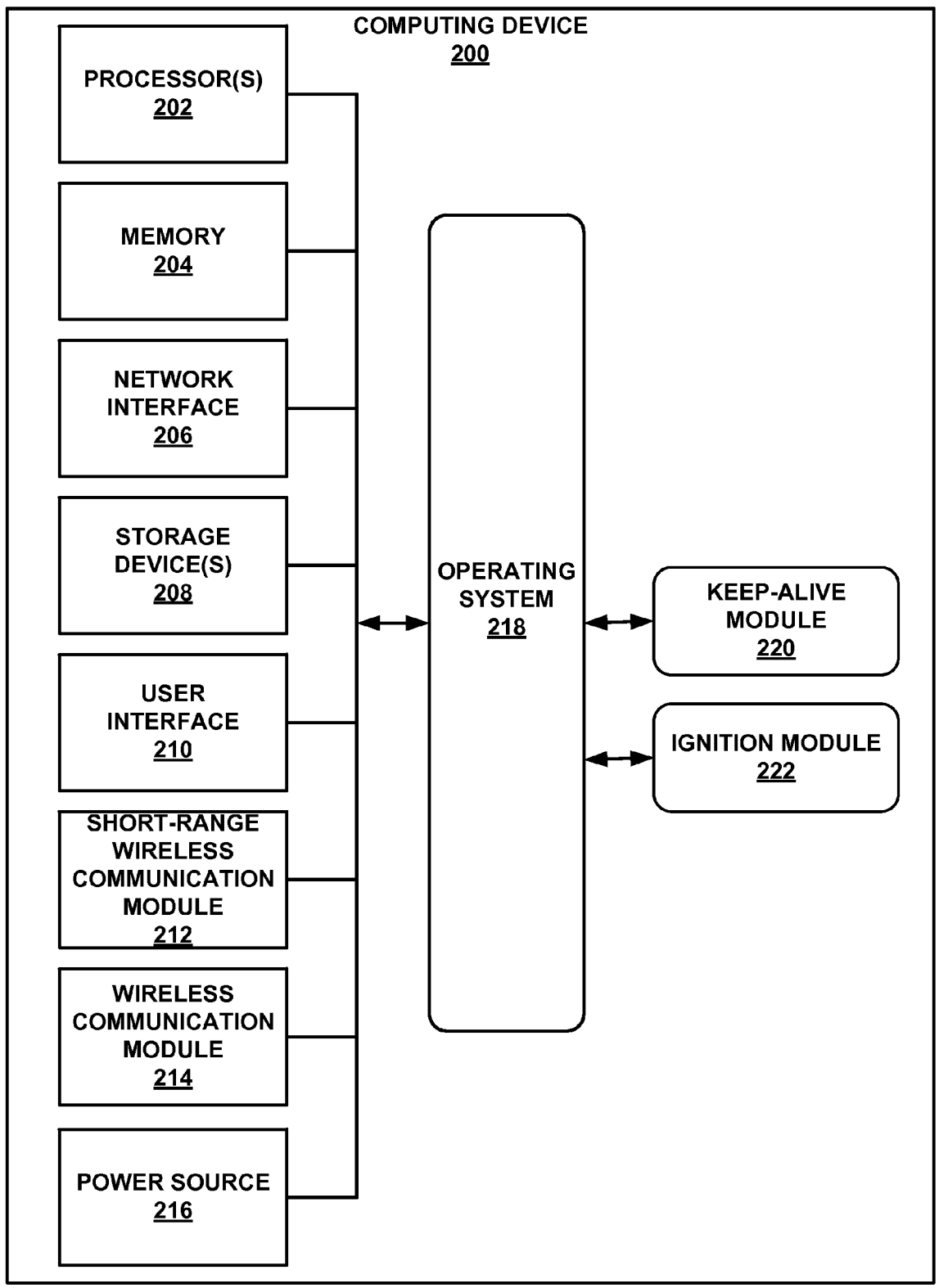
FIG. 2 illustrates a block diagram illustrating an example computing device according to some aspects of the present disclosure.

FIG. 2 illustrates a block diagram illustrating components of an example computing device 200, such as computing device 100 and vehicle control system 108 shown in FIG. 1. FIG. 2 illustrates only one particular example of computing device 200, and many other examples of computing device 200 may be used in other instances.

As shown in the specific example of FIG. 2, computing device 200 may include one or more processors 202, memory 204, network interface 206, one or more storage devices 208, user interface 210, short-range wireless communication module 212, wireless communication module 214, and power source 216. Computing device 200 may also include operating system 218, which may include modules and/or applications that are executable by one or more processors 202 and computing device 200. Computing device 200, in one example, may also include keep-alive module 220 and ignition module 222, both of which may be executable by one or more processors 202 of computing device 200. Each of the components 202, 204, 206, 208, 210, 212, 214, 216, 218, 220, and 222 may be interconnected (physically, communicatively, and/or operatively) for inter-component communications.

One or more processors 202, in one example, may be configured to implement functionality and/or process instructions for execution within computing device 200. For example, one or more processors 202 may be capable of processing instructions stored in memory 204 or instructions stored on one or more storage devices 208. These instructions may define or otherwise control the operation of operating system 218, keep-alive module 220, and ignition module 222.

Memory 204 may, in one example, be configured to store information within computing device 200 during operation. Memory 204, in some examples, may be described as a computer-readable storage medium. In some examples, memory 204 may be a temporary memory, meaning that a primary purpose of memory 204 is not long-term storage. Memory 204 may, in some examples, be described as a volatile memory, meaning that memory 204 does not maintain stored contents when computing device 200 is turned off. Examples of volatile memories may include random access memories (RAM), dynamic random access memories (DRAM), static random access memories (SRAM), and other forms of volatile memories known in the art. In some examples, memory 204 may be used to store program instructions for execution by one or more processors 202. Memory 204 may, in one example, be used by software or applications running on computing device 200 (e.g., keep-alive module 220 and ignition module 222) to temporarily store information during program execution.

One or more storage devices 208 may, in some examples, also include one or more computer-readable storage media. One or more storage devices 208 may be configured to store larger amounts of information than memory 204. One or more storage devices 208 may further be configured for long-term storage of information. In some examples, one or more storage devices 208 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 200 may, in some examples, also include network interface 206. Computing device 200 may, in one example, use network interface 206 to communicate with external devices via one or more networks. Network interface 206 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, computing device 200 may the network interface 206 to wirelessly communicate with an external device such as a server, mobile phone, or other networked computing device.

Computing device 200 may, in one example, also include user interface 210. User interface 210 may be configured to receive input from a user (e.g., tactile, audio, or video feedback). User interface 210 may include a touch-sensitive and/ or a presence-sensitive screen or display, mouse, a keyboard, a voice responsive system, or any other type of device for detecting a command from a user. In some examples, user interface 210 may include a touch-sensitive screen, mouse, keyboard, microphone, or camera.

User interface 210 may also include, combined or separate from input devices, output devices. In this manner, user interface 210 may be configured to provide output to a user using tactile, audio, or video stimuli. In one example, user interface 210 may include a touch-sensitive screen or display, sound card, a video graphics adapter card, or any other type of device for converting a signal into an appropriate form understandable to humans or machines. In addition, user interface 210 may include a speaker, a cathode ray tube (CRT) monitor, a liquid crystal display (LCD), or any other type of device that can generate intelligible output to a user.

Computing device 200, in some examples, may include power source 216, which may be a rechargeable battery and may provide power to computing device 200. Power source 216 may, in some examples, be a battery made from nickel-cadmium, lithium-ion, or other suitable material. In other examples, power source 216 may be a power source capable of providing stored power or voltage from another power source.

In addition, computing device 200 may include short-range wireless communication module 212, such as short-range wireless communication module 102 or one or more short-range wireless communication modules 108 shown in FIG. 1. As described herein, short-range wireless communication module 212 may be active hardware that is configured to communicate with other short-range wireless communication modules. Examples of short-range wireless communication module 212 may include an NFC module, an RFID module, and the like. In general, short-range wireless communication module 212 may be configured to communicate wirelessly with other devices in physical proximity to short-range wireless communication module 212 (e.g., less than approximately ten centimeters, or less than approximately four centimeters). In other examples, short-range wireless communication module 212 may be replaced with an alternative short-range communication device configured to communicate with and receive data from other short-range communication devices. These alternative short-range communication devices may operate according to Bluetooth, Ultra-Wideband radio, or other similar protocols. In some examples, short-range wireless communication module 212 may be an external hardware module that is coupled with computing device 200 via a bus (such as via a Universal Serial Bus (USB) port). short-range wireless communication module 212, in some examples, may also include software which may, in some examples, be independent from operating system 218, and which may, in some other examples, be a subroutine of operating system 218.

The computing device 200, in some examples, may also include wireless communication module 214, such as wireless communication module 104 and wireless communication module 110 shown in FIG. 1. Wireless communication module 214 may, in some examples, may be a device operable to exchange data with other wireless communication modules over short distances (e.g., less than or equal to ten meters). Examples of wireless communication module 214 may include a Bluetooth module, a WiFi direct module, and the like.

Computing device 200 may also include operating system 218. Operating system 218 may, in some examples, control the operation of components of computing device 200. For example, operating system 218 may, in one example, facilitate the interaction of keep-alive module 220 and ignition module 222 with one or more processors 202, memory 204, network interface 206, one or more storage devices 208, user interface 210, short-range wireless communication module 212, wireless communication module 214, and power source 216.

Keep-alive module 220 may be an application being executed on one or more processors 202 that may be configured to periodically send a keep-alive message via a secure connection established by wireless communication module 214 to a vehicle (such as vehicle 106 of FIG. 1) as the motor of the vehicle is running. In some examples, keep-alive module 220 may be configured to periodically send the keep-alive message to a vehicle prior to the motor of the vehicle being started.

Ignition module 222 may be an application being executed on one or more processors 202 that may be configured to send via a secure connection established by wireless communication module 214 an ignition signal to a vehicle (such as vehicle 106 of FIG. 1) that activates an ignition system operable to start the motor of the vehicle Any applications (e.g., keep-alive module 220 and ignition module 222) implemented within or executed by computing device 200 may be implemented or contained within, operable by, executed by, and/or be operatively/communicatively coupled to components of computing device 200 (e.g., one or more processors 202, memory 204, network interface 206, one or more storage devices 208, user interface 210, short-range wireless communication module 212, wireless communication module 214, and/or power source 216).

Figure 3:
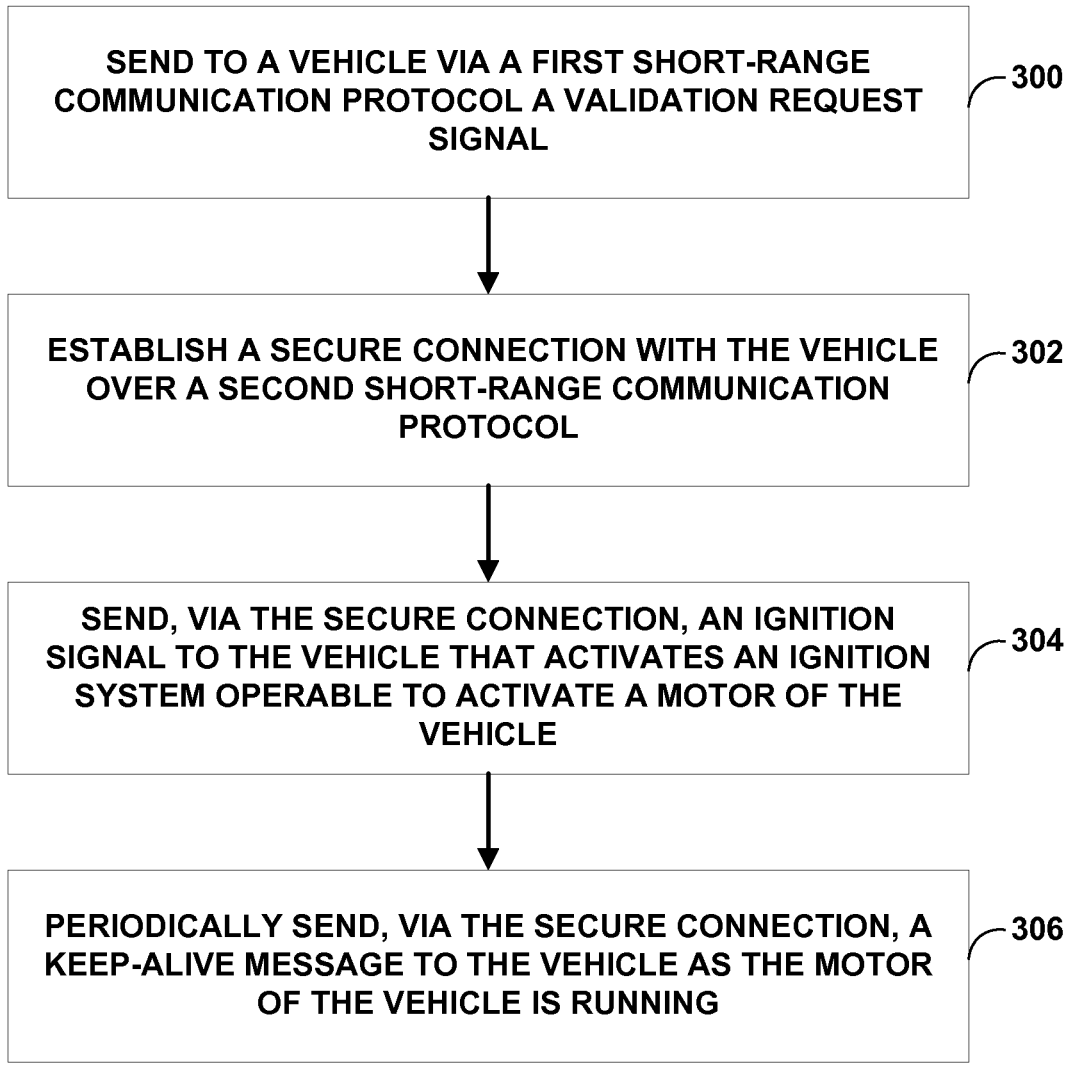
FIG. 3 illustrates a flowchart illustrating a method for using an example computing device as a smart vehicle key for an example vehicle according to some aspects of the present disclosure.

FIG. 3 illustrates a flowchart illustrating a method to use an example computing device, such as computing device 100 of FIG. 1, as a smart vehicle key for an example vehicle, such as vehicle 106 of FIG. 1. The method may include sending, from a computing device to a vehicle via a first short-range communication protocol (e.g., near field communication), a validation request signal (300). For example, the computing device may send the validation request signal using a short-range wireless communication module (such as short-range wireless communication module 102 of FIG. 1) to a short-range wireless communication module (such as one of one or more short-range wireless communication modules 108 of FIG. 1) of the vehicle. In some examples, receipt of the validation request signal by the vehicle enables the vehicle to unlock one or more of its doors without further user intervention.

The method may further include, after to sending the validation request signal, establishing, by the computing device, a secure connection with the vehicle over a second short-range communication protocol (e.g., Bluetooth) (302). For example, the computing device may establish the secure connection between a Bluetooth module (such as short-range wireless communication module 104 of FIG. 1) in the computing device and a Bluetooth module (such as short-range wireless communication module 110 of FIG. 1) in the vehicle. The method may further include sending, by the computing device via the secure connection, an ignition signal to the vehicle that activates an ignition system (such as ignition system 118 of FIG. 1) operable to start a motor of the vehicle (304). The method may further include periodically sending, by the computing device via the secure connection, a keep-alive message to the vehicle as the motor of the vehicle is running (306).

In some examples, the method may further include enrolling the computing device with the vehicle and receiving, by the computing device from the vehicle, a unique key generated by the vehicle and associated with the computing device.

In some examples, enrolling the computing device with the vehicle may further include sending a unique identifier associated with the computing device to the vehicle, wherein the unique key is generated by the vehicle at least in part on the unique identifier.

In some examples, sending the validation request signal may include sending, from the computing device to the vehicle via the first short-range communication protocol, the unique key associated with the computing device, wherein the vehicle validates the computing device as authorized to act as a vehicle key for the vehicle based at least in part on the unique key.

In some examples, establishing the secure connection may be based at least in part on an encryption key received by the computing device from the vehicle. In some examples, the encryption key may include a symmetric encryption key. In some examples, sending the ignition signal may include encrypting the ignition signal using the encryption key. In some examples, periodically sending the keep-alive message may include encrypting the keep-alive message using the encryption key.

In some examples, the keep-alive message enables the vehicle to keep the motor of the vehicle running. In some examples, the method may further include periodically sending, by the computing device via the secure connection, a keep-alive message to the vehicle before the motor of the vehicle is started. In some examples, the method may further include sending, by the computing device using the secure connection, an override code to the vehicle to override a requirement by the vehicle for the keep-alive message to keep the motor of the vehicle running. In some examples, sending the override code may include receiving, by the computing device, a pass code inputted by a user.

In some examples, the first short-range communication protocol may include near-field communication (NFC), and the second short-range communication protocol may include Bluetooth. In some examples, establishing the secure connection with the vehicle further may include receiving a Bluetooth pairing request from a Bluetooth module of the vehicle, and pairing a Bluetooth module of the computing device with the Bluetooth module of the vehicle.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

The invention claimed is:

1. A method comprising:
sending, from a computing device to a vehicle via a first short-range communication protocol, a unique identifier associated with the computing device;
receiving, by the computing device from the vehicle via the first short-range communication protocol, a unique key that is associated with the computing device and that is generated by the vehicle based at least in part on the unique identifier associated with the computing device;
sending, from the computing device to the vehicle via the first short-range communication protocol, a validation request signal, wherein the validation request signal includes the unique key that is associated with the computing device;
in response to the computing device being authorized by the vehicle to act as a vehicle key for the vehicle based at least in part on the validation request signal, establishing, by the computing device, a secure connection with the vehicle over a second short-range communication protocol;
sending, by the computing device via the secure connection, a signal to the vehicle to activate a motor of the vehicle; and
periodically sending, by the computing device via the secure connection, a keep-alive message to the vehicle as the motor of the vehicle is running.

2. The method of claim 1, wherein receipt of the validation request signal by the vehicle enables the vehicle to unlock one or more of its doors without further user intervention.

3. The method of claim 1, further comprising:
enrolling the computing device with the vehicle; and
receiving, by the computing device from the vehicle, the unique key generated by the vehicle and associated with the computing device.

4. The method of claim 3, wherein enrolling the computing device with the vehicle further comprises:

sending a unique identifier associated with the computing device to the vehicle, wherein the unique key is generated by the vehicle based at least in part on the unique identifier.

5. The method of claim 1, wherein establishing the secure connection is based at least in part on an encryption key received by the computing device from the vehicle.

6. The method of claim 5, wherein the encryption key includes a symmetric encryption key.

7. The method of claim 5, wherein sending the signal comprises:
encrypting the signal using the encryption key.

8. The method of claim 5, wherein periodically sending the keep-alive message comprises:
encrypting the keep-alive message using the encryption key.

9. The method of claim 1, wherein the keep-alive message enables the vehicle to keep the motor of the vehicle running.

10. The method of claim 9, further comprising:
periodically sending, by the computing device via the secure connection, the keep-alive message to the vehicle before the motor of the vehicle is activated.

11. The method of claim 9, further comprising:
sending, by the computing device using the secure connection, an override code to the vehicle to override a requirement by the vehicle for the keep-alive message to keep the motor of the vehicle running.

12. The method of claim 11, wherein sending the override code comprises:
receiving, by the computing device, a pass code inputted by a user.

13. The method of claim 1, wherein:
the first short-range communication protocol includes near-field communication (NFC); and
the second short-range communication protocol includes Bluetooth.

14. The method of claim 1, wherein establishing the secure connection with the vehicle further comprises:
receiving a Bluetooth pairing request from a Bluetooth module of the vehicle; and
pairing a Bluetooth module of the computing device with the Bluetooth module of the vehicle.

15. A non-transitory computer-readable medium comprising instructions that, when executed on at least one programmable processor, causes the at least one programmable processor to perform operations comprising:
sending, from a computing device to a vehicle via a first short-range communication protocol, a unique identifier associated with the computing device;
receiving, by the computing device from the vehicle via the first short-range communication protocol, a unique key that is associated with the computing device and that is generated by the vehicle based at least in part on the unique identifier associated with the computing device;
sending, from the computing device to a vehicle via the first short-range communication protocol, a validation request signal, wherein the validation request signal includes the unique key that is associated with the computing device;
in response to the computing device being authorized by the vehicle to act as a vehicle key for the vehicle based at least in part on the validation request signal, establishing, by the computing device, a secure connection with the vehicle over a second short-range communication protocol;

sending, by the computing device via the secure connection, a signal to the vehicle to activate a motor of the vehicle; and periodically sending, by the computing device via the secure connection, a keep-alive message to the vehicle as the motor of the vehicle is running.

16. The computer-readable medium of claim 15, wherein receipt of the validation request signal by the vehicle enables the vehicle to unlock one or more of its doors without further user intervention.

17. The computer-readable medium of claim 15, further comprising:

enrolling the computing device with the vehicle; and
receiving, by the computing device from the vehicle, the unique key associated with the computing device.

18. A computing device comprising:

one or more processors;
a near field communication (NFC) module configured to:
send, to a vehicle via a first short-range communication protocol, a unique identifier associated with the computing device,
receive, from the vehicle via the first short-range communication protocol, a unique key that is associated with the computing device and that is generated by the vehicle based at least in part on the unique identifier associated with the computing device, and
send, to the vehicle via a first short-range communication protocol, a validation request signal, wherein the validation request signal includes the unique key that is associated with the computing device;

a Bluetooth module configured to, in response to the computing device being authorized by the vehicle to act as a vehicle key for the vehicle based at least in part on the validation request signal, establish a secure connection with the vehicle over a second short-range communication protocol;

an activation module operable on the one or more processors and configured to send via the secure connection a signal to the vehicle to activate a motor of the vehicle; and a keep-alive module operable on the one or more processors and configured to periodically send a keep-alive message via the secure connection to the vehicle as the motor of the vehicle is running.

19. The computing device of claim 18, wherein receipt of the validation request signal by the vehicle enables the vehicle to unlock one or more of its doors without further user intervention.

* * * * *